(12) United States Patent
Wang et al.

(10) Patent No.: US 7,844,589 B2
(45) Date of Patent: Nov. 30, 2010

(54) METHOD AND APPARATUS FOR PERFORMING A SEARCH

(75) Inventors: Xuejun Wang, San Jose, CA (US); Brian Acton, Saratoga, CA (US); Venkat Panchapakesan, Newark, CA (US)

(73) Assignee: Yahoo! Inc., Sunnyvale, CA (US)

( * ) Notice: Subject to any disclaimer, the term of this patent is extended or adjusted under 35 U.S.C. 154(b) by 143 days.

(21) Appl. No.: 10/725,197

(22) Filed: Dec. 1, 2003

(65) Prior Publication Data

US 2005/0108210 A1    May 19, 2005

Related U.S. Application Data

(60) Provisional application No. 60/520,845, filed on Nov. 18, 2003.

(51) Int. Cl.
*G06F 17/30* (2006.01)
*G06F 7/00* (2006.01)

(52) U.S. Cl. .................. 707/706; 707/723; 707/748; 707/767

(58) Field of Classification Search ............ 707/1–10, 707/100–104.1, 200–205; 705/1
See application file for complete search history.

(56) References Cited

U.S. PATENT DOCUMENTS

| | | | | | |
|---|---|---|---|---|---|
| 5,283,856 | A | * | 2/1994 | Gross et al. | 706/47 |
| 5,555,346 | A | * | 9/1996 | Gross et al. | 706/45 |
| 5,590,269 | A | * | 12/1996 | Kruse et al. | 705/9 |
| 5,619,648 | A | * | 4/1997 | Canale et al. | 709/206 |
| 5,640,553 | A | | 6/1997 | Schultz | |
| 5,642,502 | A | * | 6/1997 | Driscoll | 707/5 |
| 5,649,186 | A | * | 7/1997 | Ferguson | 707/10 |
| 5,706,497 | A | * | 1/1998 | Takahashi et al. | 707/5 |
| 5,717,913 | A | * | 2/1998 | Driscoll | 707/5 |
| 5,724,567 | A | * | 3/1998 | Rose et al. | 707/2 |
| 5,737,728 | A | * | 4/1998 | Sisley et al. | 705/8 |
| 5,799,304 | A | * | 8/1998 | Miller | 707/7 |
| 5,819,267 | A | * | 10/1998 | Uyama | 707/6 |
| 5,819,269 | A | * | 10/1998 | Uomini | 707/7 |
| 5,822,527 | A | * | 10/1998 | Post | 709/206 |

(Continued)

FOREIGN PATENT DOCUMENTS

FR    2802671 A1    6/2001

(Continued)

OTHER PUBLICATIONS

Sicaras, Victoria K.: "Searching for the perfect way to search"; Research & Development; Jun. 2000; v42, i6, pE17.

(Continued)

*Primary Examiner*—Tim T. Vo
*Assistant Examiner*—Sangwoo Ahn (57) ABSTRACT

A method and apparatus for generating search results with higher relevancy. More specifically, the present invention provides a listing of narrowing or related search terms based upon the search term submitted by the user. The present invention effectively guides users to narrow their search by guiding users to select or click on highly related search terms. In one embodiment, the listing of the highly related search terms is generated in accordance with sales and/or click information, e.g., via scoring of search terms that is premised on sales and/or click information.

50 Claims, 9 Drawing Sheets

U.S. PATENT DOCUMENTS

| | | | |
|---|---|---|---|
| 5,826,022 A * | 10/1998 | Nielsen | 709/206 |
| 5,867,799 A * | 2/1999 | Lang et al. | 707/1 |
| 5,870,744 A * | 2/1999 | Sprague | 707/9 |
| 5,909,679 A * | 6/1999 | Hall | 707/4 |
| 5,987,460 A * | 11/1999 | Niwa et al. | 707/6 |
| 5,999,932 A * | 12/1999 | Paul | 707/10 |
| 6,029,195 A * | 2/2000 | Herz | 725/116 |
| 6,052,709 A * | 4/2000 | Paul | 709/202 |
| 6,072,942 A * | 6/2000 | Stockwell et al. | 709/206 |
| 6,119,114 A * | 9/2000 | Smadja | 707/7 |
| 6,189,002 B1 * | 2/2001 | Roitblat | 707/1 |
| 6,249,805 B1 * | 6/2001 | Fleming, III | 709/206 |
| 6,266,692 B1 * | 7/2001 | Greenstein | 709/206 |
| 6,269,361 B1 | 7/2001 | Davis et al. | |
| 6,321,221 B1 | 11/2001 | Bieganski | |
| 6,366,910 B1 | 4/2002 | Rajaraman et al. | |
| 6,393,423 B1 * | 5/2002 | Goedken | 707/10 |
| 6,466,970 B1 | 10/2002 | Lee et al. | |
| 6,480,837 B1 | 11/2002 | Dutta | |
| 6,499,052 B1 | 12/2002 | Hoang et al. | |
| 6,539,377 B1 | 3/2003 | Culliss | |
| 6,546,390 B1 * | 4/2003 | Pollack et al. | 707/7 |
| 6,571,238 B1 * | 5/2003 | Pollack et al. | 707/5 |
| 6,578,025 B1 * | 6/2003 | Pollack et al. | 707/2 |
| 6,631,372 B1 | 10/2003 | Graham | |
| 6,701,314 B1 * | 3/2004 | Conover et al. | 707/7 |
| 6,704,727 B1 * | 3/2004 | Kravets | 707/5 |
| 6,785,671 B1 | 8/2004 | Bailey et al. | |
| 6,842,761 B2 | 1/2005 | Diamond et al. | |
| 6,947,930 B2 * | 9/2005 | Anick et al. | 707/5 |
| 6,963,867 B2 | 11/2005 | Ford et al. | |
| 7,251,625 B2 | 7/2007 | Anglum | |
| 2001/0014868 A1 * | 8/2001 | Herz et al. | 705/14 |
| 2001/0047354 A1 * | 11/2001 | Davis et al. | 707/3 |
| 2002/0133726 A1 * | 9/2002 | Kawamae et al. | 713/300 |
| 2003/0078915 A1 * | 4/2003 | chaudhuri et al. | 707/3 |
| 2003/0135490 A1 | 7/2003 | Barrett et al. | |
| 2003/0216930 A1 * | 11/2003 | Dunham et al. | 705/1 |
| 2005/0071255 A1 | 3/2005 | Wang et al. | |
| 2005/0080795 A1 * | 4/2005 | Kapur et al. | 707/100 |
| 2005/0240580 A1 * | 10/2005 | Zamir et al. | 707/4 |

FOREIGN PATENT DOCUMENTS

| | | |
|---|---|---|
| WO | WO-9941694 | 8/1999 |
| WO | WO-9948028 | 9/1999 |
| WO | WO-0142880 | 6/2001 |
| WO | WO-0146870 | 6/2001 |
| WO | WO-02091225 | 11/2002 |

OTHER PUBLICATIONS

International Search Report mailed Apr. 7, 2006, for International application No. PCT/US04/38515. 4 pages.

International Preliminary Report of Patentability and Written Opinion mailed Apr. 7, 2006, for International application No. PCT/US04/38515. 4 pages.

International Search Report and Written Opinion mailed Sep. 15, 2005, for PCT Application No. PCT/US04/32258 filed Sep. 30, 2004, 10 pages.

European Examination Report mailed on Jun. 2, 2009, for EP Application No. 04789409.2, filed on Sep. 30, 2004, 3 pages.

Supplementary European Search Report mailed Mar. 19, 2009, for EP Application No. 04789409.2 filed Sep. 30, 2004, 4 pages.

Chinese Office Action issued Jul. 24, 2009, for CN Application No. 20040030053.2 filed on Sep. 20, 2004, 4 pages. (English translation attached, 5 pages).

* cited by examiner

FIG. 8

METHOD AND APPARATUS FOR PERFORMING A SEARCH

This application claims the benefit of U.S. Provisional Application No. 60/520,845 filed on Nov. 18, 2003, which is herein incorporated by reference.

The present invention relates to a method and apparatus for assisting a user in performing a search. More specifically, the present invention relates to a novel approach that applies transaction and/or click records to assist a user in narrowing or focusing a search.

BACKGROUND OF THE INVENTION

With the proliferation of vast amount of information on the Internet, it is often very difficult to search and locate relevant information without having to first expend a great deal of time to peruse over many irrelevant search results. Depending on the material that is being sought, the user is often frustrated by having to view many immaterial search results.

One difficulty in searching for relevant information on the Web is that the user is often not using the most relevant search term(s). For example, a user may enter very general terms such as "Sony" or "shoes" and the like. Such general terms often produce a very large number of search results. The results are not particularly focused and often require a substantial amount of filtering by the user, where the user may have to enter additional narrowing terms. Unfortunately, the reason that the user may have started the search with a very general term could very well be that the user is not sure of a more specific search term to better define the search. For example, the user may be looking for the latest and most popular video game, but is not sure of the specific title or the manufacturer of the video game. As a result, the user is often required to view many immaterial search results before reaching the proper document or to further deduce a better or more focused search term.

Therefore, there is a need in the art for a method and apparatus that provides search results with higher relevancy.

SUMMARY OF THE INVENTION

In one embodiment, the present invention provides a method and apparatus for generating search results with higher relevancy. More specifically, the present invention provides a listing of narrowing or related search terms based upon the search term submitted by the user. The present invention effectively guides users to narrow their search by guiding users to select or click on highly related search terms. In one embodiment, the listing of the highly related search terms is generated in accordance with sales and/or click information, e.g., via scoring of search terms that is premised on sales and/or click information. Thus, the present invention provides a significant benefit in that the destination page or search result associated with each of the highly related search terms will likely be relevant to the user's search. For example, in the context of shopping the search result will likely present products that are known to be popular and have recently been sold or clicked.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
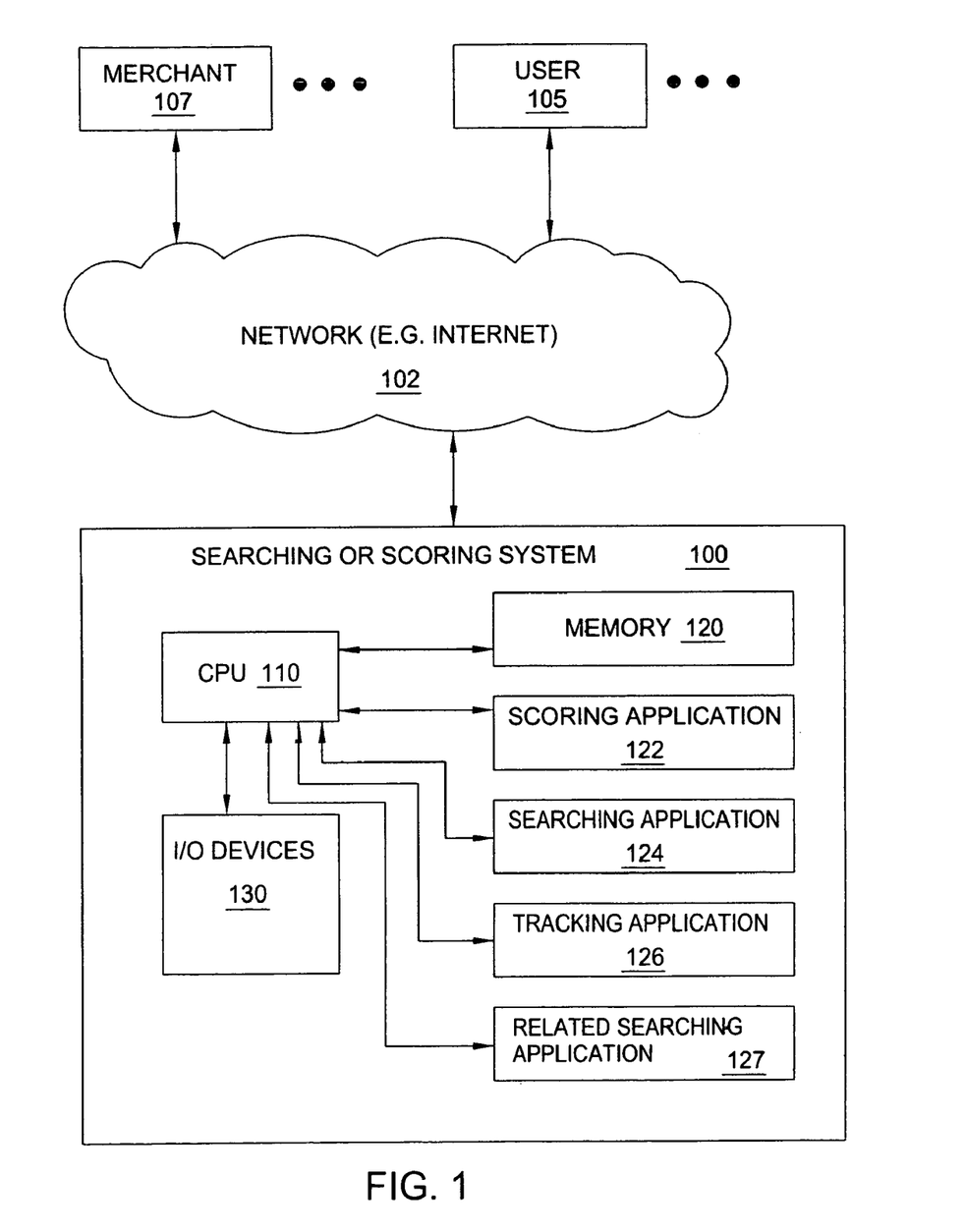
FIG. 1 is a block diagram illustrating a scoring system of the present invention.

FIG. 1 is a block diagram illustrating a scoring system 100 of the present invention. The scoring system 100 is tasked with scoring a document, e.g., a product, a service, a website or an article, within a search result set generated in accordance with a search term. For brevity, it should be noted that although the present invention is described below within the context of searching for a product, the present invention is not so limited. In other words, the present invention is applicable in assisting a user to refine a search for a document in general.

More specifically, FIG. 1 illustrates a searching or scoring system 100 that is interacting with a network, e.g., the Internet 102, where a plurality of users 105 is allowed to conduct searches. The search is typically triggered by the users who will input one or more search terms, e.g., "laptop computer", "DVD", "gas grill" and so on. The search may include a search for products and services desired by the users. The products and services may be offered by an entity maintaining the searching or scoring system 100, e.g., a company that is operating a website that offers a large volume of products and services, e.g., Walmart and the like. Alternatively, the products and services may be offered by a plurality of merchants 107, where the searching or scoring system 100 is deployed by a third party and is only tasked with generating the search results associated with the search term provided by the users, e.g., a search engine application. In sum, the system 100 of the present invention is not limited in the manner that it is deployed.

In one embodiment, the system 100 is implemented using a general purpose computer or any other hardware equivalents. More specifically, the scoring system 100 comprises a processor (CPU) 110, a memory 120, e.g., random access memory (RAM) and/or read only memory (ROM), a scoring engine or application 122, a searching engine or application 124, a tracking engine or application 126, a related searching engine or application 127 and various input/output devices 130 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the scoring engine or application 122, the searching engine or application 124, the tracking engine or application 126, and the related searching engine or application 127 can be implemented as physical devices or systems that are coupled to the CPU 110 through a communication channel. Alternatively, the scoring engine or application 122, the searching engine or application 124, the tracking engine or application 126, and the related searching engine or application 127 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 120 of the computer. As such, the scoring engine or application 122, the searching engine or application 124, the tracking engine or application 126, and the related searching engine or application 127 (including associated data structures) of the present invention can be stored on a computer readable medium, e.g., RAM memory, magnetic or optical drive or diskette and the like.

In one embodiment, the searching or scoring system is designed to address the criticality of improving search relevancy. For example, the present invention exploits the fact that users disclose their preference pertaining to favorite products for popular search terms through purchasing or clicking on products that they like. When users search a term in a shopping/product search site, the site will often return numerous irrelevant results, even in the top result positions. Often, users will simply filter out the wrong results, and only select the results that they are interested in, i.e., relevant results. The relevancy of the search results is significantly substantiated when a user actually purchases a product selected from the search results. Namely, when a user decides to buy the product, then the product he or she chose must be highly relevant to the search term within the context of the price of the product and/or the merchant selling the product.

It has been determined that if the tracking data size is sufficiently large, users' choices on each given search term tend to converge to several products from several merchants, and all of the results are very relevant to the search term. By learning and applying users' choices, especially from purchasing and/or clicking, highly relevant products can be assigned with higher score/rank than over text relevant only products. This novel approach will produce highly relevant search results for a search term. In fact, additionally refinements or normalization can be applied, e.g., the ordering of merchants for each search term. These optional adjustments are further described below.

In one embodiment of the present invention, the score assigned to a product in response to a search term that is based on user purchase and/or click information is referred to as a "hotscore". This hotscore can be used by a search engine in producing search results in response to a search term. In one embodiment, the present hotscore is used in generating the search results or, alternatively, is employed to supplement a search engine that currently employs other parameters, such as including, paid inclusion, paid sponsorship, and text relevancy. An example of a method for generating and using scores assigned to a product or a product-merchant pair that are based on user purchase and/or click information is disclosed in U.S. patent application Ser. No. 10/675,234, filed on Sep. 30, 2003 and is herein incorporated by reference in its entirety.

Figure 2:
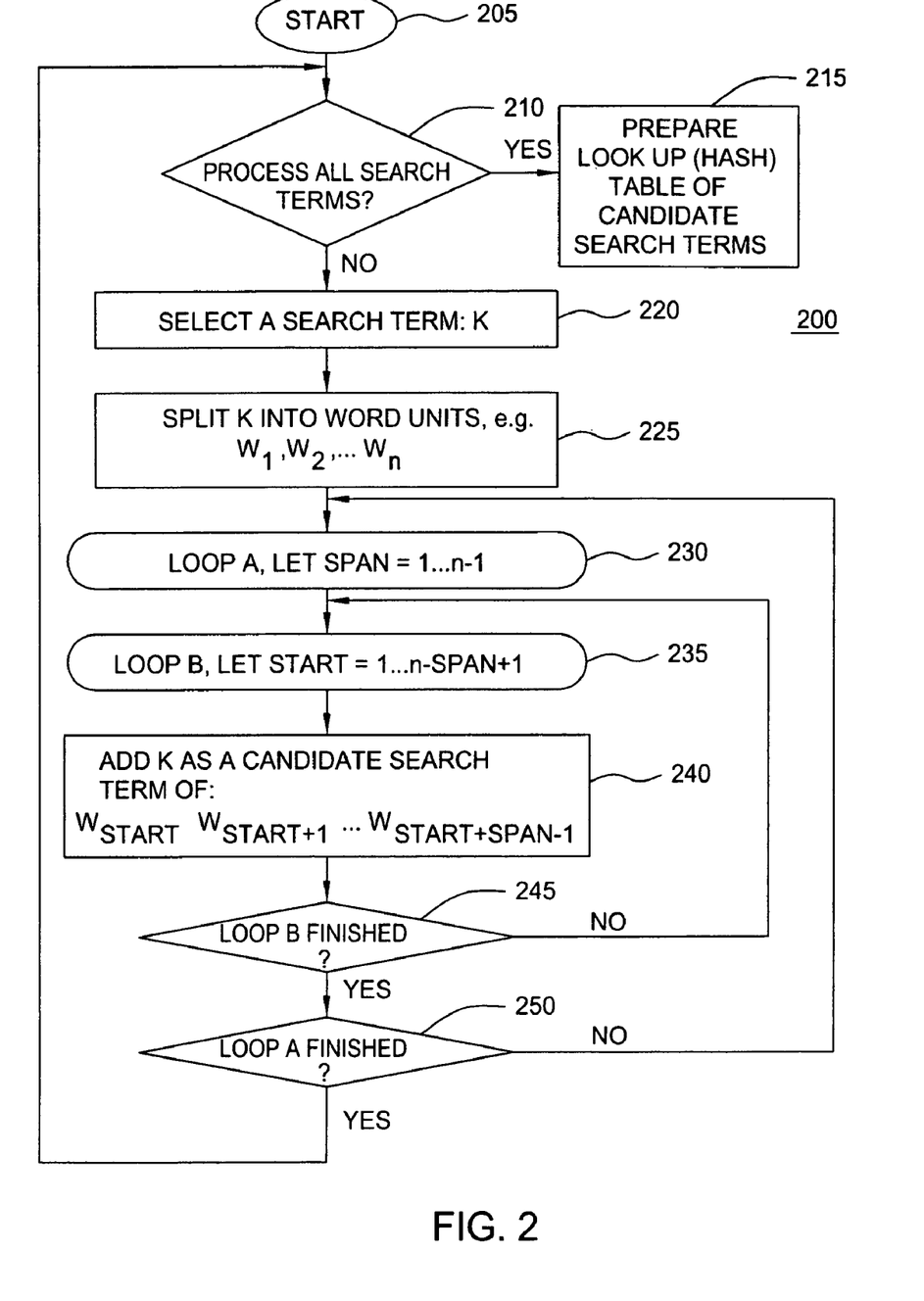
FIG. 2 illustrates a flowchart of a method for generating a plurality of candidate search terms.

FIG. 2 illustrates a flowchart of a method 200 for generating a plurality of candidate search terms or related search terms. In one embodiment, the present invention attempts to assist the user in narrowing or focusing the user's search. For example, a user who provides a search term "Apple" will be presented with a plurality of narrower or more refined search terms such as "ipod", "computer", "powerbook g4", "apple peeler", "apple pie", "apple cider vinegar", and so on. This ability to assist the user to quickly arrive to a narrower search term will greatly enhance the user's searching experience.

In order to provide accurate refined search terms to a user's search term, it is necessary to first generate a list of related search terms or candidate search terms. In turn, these candidate search terms are organized or identified as being related to one or more search terms. This process of generating a list of candidate search terms is typically implemented off-line, but it can be generated dynamically as well.

Method 200 starts in step 205 and proceeds to step 210, where method 200 queries whether all search terms have been processed. Specifically, method 200 has access to a list of search terms. These search terms can be collected by monitoring search terms that are used by a plurality of users as received by a website. Alternatively, these search terms can be arbitrarily generated. If the query of step 210 is positively answered, then method 200 ends in step 215. If the query is negatively answered, then method 200 proceeds to step 220.

In step 220, method 200 selects a search term K. A search term may comprise one or more words. For example, search terms may comprise the following terms: "Sony", "digital camera", "Sony digital camera", "progressive scan DVD player" and so on.

In step 225, the search term K is split into word units. For example, the search term "Sony digital camera" will be split into "Sony", "digital", and "camera".

In step 230, method 200 enters loop A where "span" is set to a value ranging from 1 to n−1. On the first pass, span is set to 1.

In step 235 method 200 enters loop B where "start" is set to a value ranging from 1 to n-span+1. On the first pass, start is set to 1.

In step 240, the term K is added as a candidate search term to one or more word units. To illustrate, if K is "Sony digital camera", then the search term "Sony digital camera" will be deemed to be a candidate search term for each of the search terms "Sony", "digital" and "camera". In other words, the search term "Sony digital camera" is deemed to be a relevant candidate search term for each of the word units that forms the search term "Sony digital camera".

On a second pass within loop A, the search term "Sony digital camera" will be deemed to be a candidate search term for the search terms "Sony digital", and "digital camera". In other words, the search term "Sony digital camera" is deemed to be a relevant candidate search term for every two consecutive word units that form the search term "Sony digital camera" and so on.

In step 245, method 200 queries whether loop B is finished. If the query is positively answered, then method 200 proceeds to step 250. If the query is negatively answered, then method 200 proceeds to step 235, where start is incremented to the next value.

In step 250, method 200 queries whether loop A is finished. If the query is positively answered, then method 200 proceeds to step 210. If the query is negatively answered, then method 200 proceeds to step 230, where span is incremented to the next value.

Figure 3:
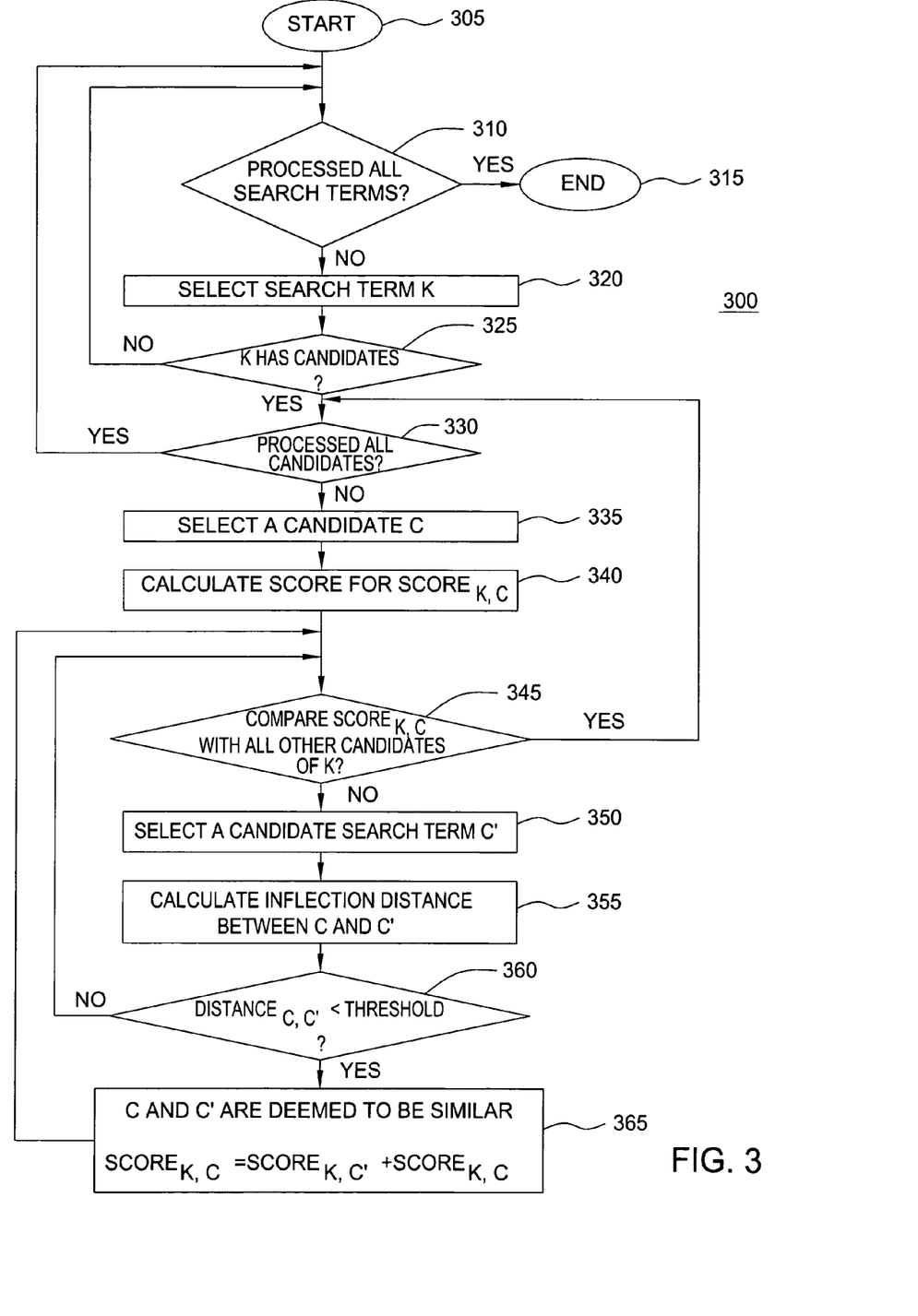
FIG. 3 illustrates a flowchart of a method for refining a list of candidate search terms.

FIG. 3 illustrates a flowchart of a method 300 for refining a list of candidate search terms. In other words, a plurality of candidate search terms may have been associated with a particular search term as shown in FIG. 2. For example, the search terms "Sony digital", "Sony digital camera", "Sony digital cameras", "digital camera" and "digital cameras" can all be deemed to be candidate search terms for the search term "Sony". However, some of these candidate search terms may be deemed to be so similar, e.g., "digital camera" versus "digital cameras" that a user need not be informed of both of these possible narrowing search terms. Similarly, there are other terms that users in general are not inclined to use as search terms, e.g., "Sony digital". Thus, it would be beneficial to refine such a candidate list.

Method 300 starts in step 305 and proceeds to step 310, where method 300 queries whether all search terms have been processed. Specifically, method 300 has access to a list of search terms. If the query of step 310 is positively answered, then method ends in step 315. If the query is negatively answered, then method 300 proceeds to step 320.

In step 320, method 300 selects a search term K. A search term may comprise one or more words. For example, the search term can be "Sony".

In step 325, method 300 queries whether K has candidate search terms. If the query is negatively answered, then method 300 returns to step 310. If the query is positively answered, then method 300 proceeds to step 330.

In step 330, method 300 queries whether all candidate search terms of K have been processed. If the query is positively answered, then method 300 returns to step 310. If the query is negatively answered, then method 300 proceeds to step 335.

In step 335, method 300 selects a candidate search term C for K. For example, if K is "Sony", then C can be "Sony digital camera".

In step 340, method 300 calculates a score for the $Score_{K,C}$. $Score_{K,C}$ represents the relevancy score of search term C to search term K. In one embodiment, $Score_{K,C}$ is derived from the Hotscore as disclosed in U.S. patent application Ser. No. 10/675,234. However, relevancy scores based on other criteria can certainly be equally applied. In some instances, $Score_{K,C}$ may represent a sum of relevancy scores. For example, if C is "Sony digital camera", then the scores for all models of "Sony digital camera" are summed to derive a relevancy score $Score_{K,C}$ for the search term "Sony digital camera".

In step 345, method 300 compares the $Score_{K,C}$ with other scores for all candidate search terms of K. For example, $Score_{K,C}$ is compared with a list of scores for all other candidates of K so that the placement order of $Score_{K,C}$ can be deduced. In other words, method 300 is able to sort the order of candidate search terms for each search term K based on the relevancy scores of all the candidate search terms. For example, the candidate search term "Sony digital camera" should have a relatively high $Score_{K,C}$ when compared with the candidate search term "Sony digital".

In step 350, method 300 selects a candidate search term C' such as "Sony digital cameras". This term is very similar to the candidate search term "Sony digital camera".

In step 355, method 300 computes an inflection distance between C and C'. In one embodiment, the inflection is premised on the number of words that are different between two candidate search terms. For example, the inflection distance between "Sony digital cameras" and "Sony digital camera" is one. However, other methods of computing inflection distance can be employed, e.g., a method that is premised on the number of letters that are different in each word and so on.

In step 360, method 300 queries whether the $distance_{C, C'}$ is less than a threshold. In one embodiment, the threshold is set to be 2, but this threshold can be tailored accordingly to comply with a particular implementation. If the query is negatively answered, then method 300 returns to step 345. If the query is positively answered, then method 300 proceeds to step 365.

In step 365, method 300 deems the search term C (e.g. Sony digital cameras) and search term C' (e.g., Sony digital camera) to be very similar. As such, one of these candidate search terms can be removed from the list of candidate search terms. The relevancy score for the remaining candidate search term C or C' will also receive the relevancy score of the removed candidate search term. For example, the candidate search term "Sony digital cameras" and be removed and its relevancy score can be added to the relevancy score for "Sony digital camera" or vise versa.

Figure 4:
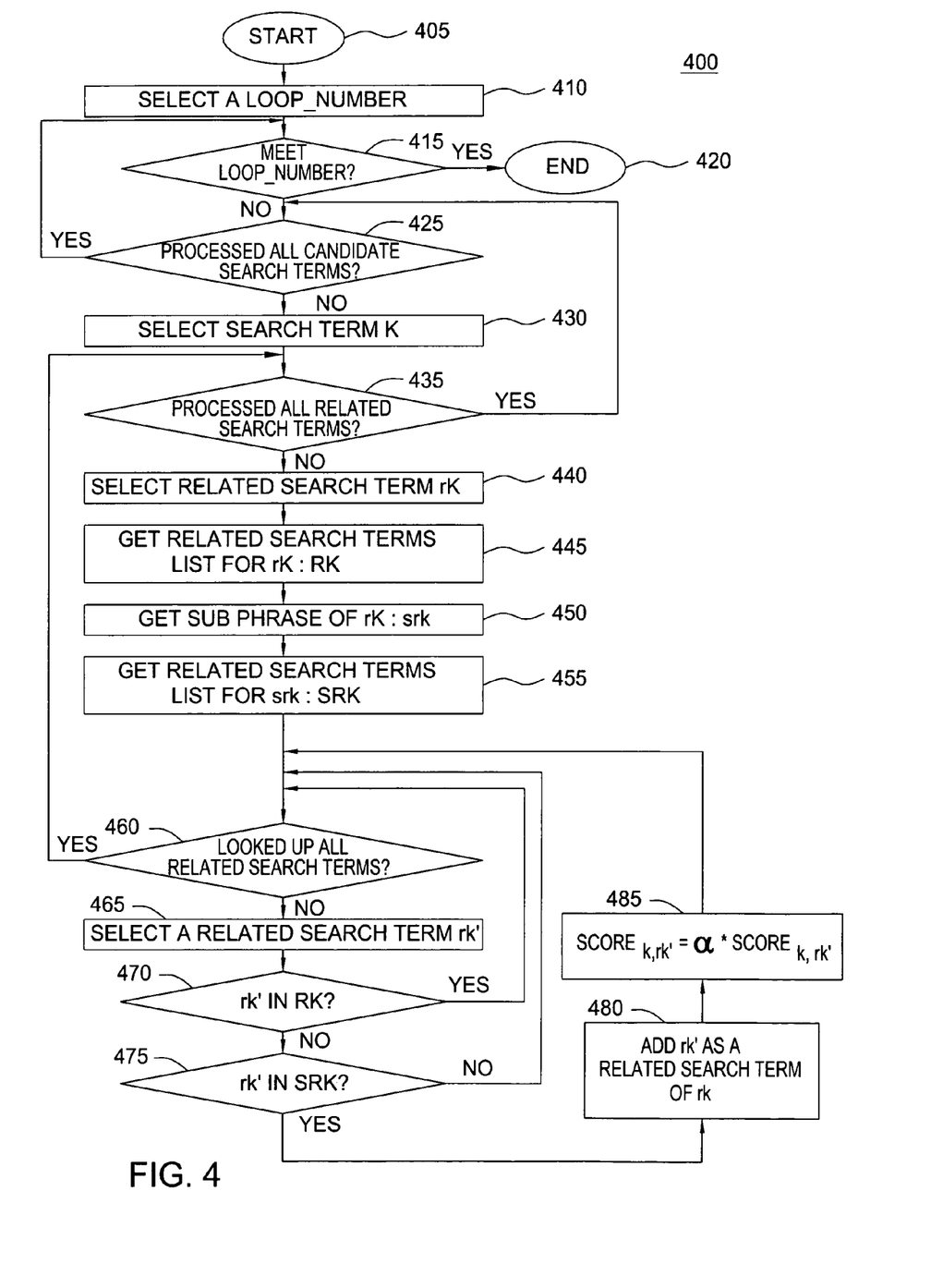
FIG. 4 illustrates a flowchart of a method for adding additional candidate search terms.

FIG. 4 illustrates a flowchart of a method 400 for adding additional candidate search terms. Namely, although the method 200 of FIG. 2 may properly identify a search term as a candidate search term for a list of search terms, it is possible that other search terms may be missed. For example, it may be appropriate to identify the search term "Sony digital camera" or the search term "Sony digital five megabits camera" as a candidate search term for the search term "Sony camera". Using method 200, this association can be missed.

Method 400 starts in step 405 and proceeds to step 410, where a loop_number is selected. Namely, method 400 is an iterative method and the loop_number defines the number of times that method 400 will be repeated. For brevity, method 400 is described below as having a loop_number of one.

In step 415, method 400 queries whether a loop_number has been met. If the query is positively answered, then method 400 ends in step 420. If the query is negatively answered, then method 400 proceeds to step 425.

In step 425, method 400 queries whether all the candidate search terms have been processed. If the query is positively answered, then method 400 returns to step 415. If the query is negatively answered, then method 400 proceeds to step 430.

In step 430, method 400 selects a candidate search term K. For example, the candidate search term can be "camera".

In step 435, method 400 queries whether all the related search terms have been processed. If the query is positively answered, then method 400 returns to step 425. If the query is negatively answered, then method 400 proceeds to step 440.

In step 440, method 400 selects a related search term rk. For example, the related search term can be "Sony camera".

In step 445, method 400 gets a list RK of related search terms for rk. For example, the list may comprise the following related search terms: "Sony camera case", "Sony camera battery", "Sony camera cleaning kit", and so on.

In step 450, method 400 gets a subphrase, srk of rk. For example, srk can be "Sony".

In step 455, method 400 gets a list SRK of related search terms for srk. For example, the list may comprise the following related search terms: "Sony digital camera", "Sony TV", and so on.

In step 460, method 400 queries whether all related search terms have been looked up. If the query is positively answered, then method 400 returns to step 435. If the query is negatively answered, then method 400 proceeds to step 465.

In step 465, method 400 selects a related search term rk'. For example, rk' can be "Sony digital camera".

In step 470, method 400 queries whether rk' is in RK. If the query is positively answered, then method 400 returns to step 460. If the query is negatively answered, then method 400 proceeds to step 475.

In step 475, method 400 queries whether rk' is in SRK. If the query is positively answered, then method 400 proceeds to step 480. If the query is negatively answered, then method 400 returns to step 460.

In step 480, method 400 adds rk' as a related search term for rk. For example, "Sony digital camera" is deemed to be a candidate search term for "Sony camera". Thus, method 400 is capable of identifying the search term "Sony digital camera" as a candidate search term for "Sony camera", whereas method 200 would have missed this association.

In step 485, method 400 applies an adjustment factor, alpha α, to the relevancy $score_{K,rK}$ to arrive at the relevancy $score_{rk, rk'}$. In one embodiment, alpha is set to less than 1, e.g., 0.8. In one embodiment, the relevancy score represents the relevancy of one search term to another search term, e.g., "Sony digital camera" to "Sony camera". This adjustment in step 485 is made to account for the fact that the relevancy score is derived from relevancy score$_{K,rK}$, i.e., from "Sony digital camera" to "camera".

A higher score$_{K,C}$ means that the relevancy between the search term K and search term C is very high. Thus, a searching system can employ these relevancy scores to further assist a user in refining or narrowing the search. This is illustrated in FIG. 5.

Figure 5A:
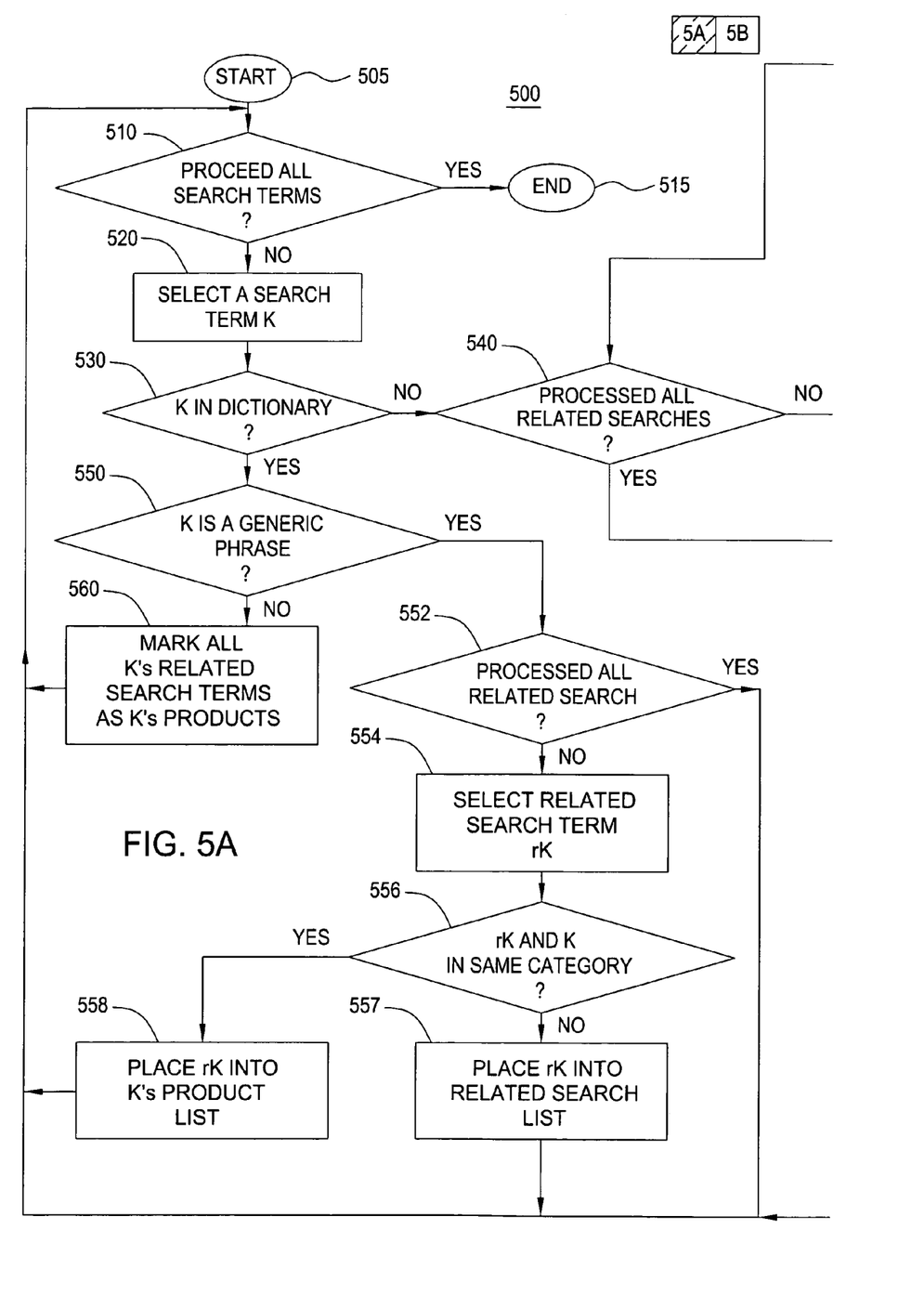
FIG. 5 illustrates a flowchart of a method for generating a plurality of related search terms to assist a user in narrowing a search.
Figure 5B:
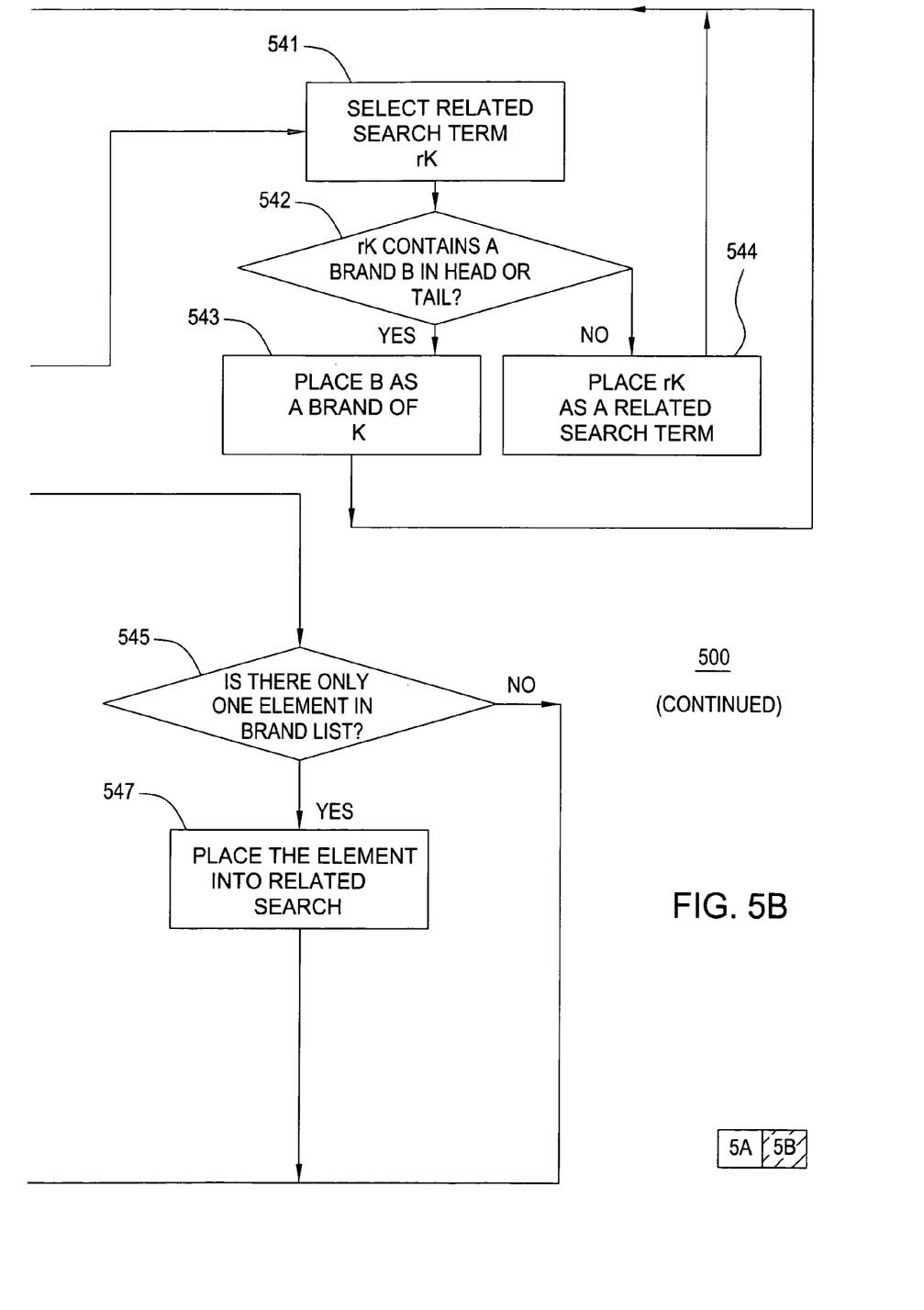

FIG. 5 illustrates a flowchart of a method 500 for receiving a search request from a user and for generating a plurality of related search terms to assist a user in refining a search. Specifically, FIG. 5 illustrates a method for correlating a user search term with a plurality of candidate or possible search terms that will further assist in narrowing the user's search.

Method 500 starts in step 505 and proceeds to step 510, where method 500 queries whether all search terms have been processed. The search terms are typically received from the users. In the context of a website, the search terms are provided by users who are visiting a website to search for a product, a service, a document and so on. If the query is positively answered, then method 500 ends in step 515. If the query is negatively answered, then method 500 proceeds to 520.

In step 520, a search term K is selected. For example, the search term can be "Apple" entered by a user visiting a website.

In step 530, method 500 queries whether K is identified in a dictionary. In one embodiment, there are one or more dictionaries, e.g., a brand dictionary that contains a listing of brand names, a performing artist dictionary that contains a listing of singers, performers, bands, actors and so on. The advantage in deploying specific dictionaries is that if the search term matches a brand or an artist, then it is possible to quickly assist the user in narrowing the search. In other words, the ability to detect the presence of a brand or an artist in the search term will greatly enhance the insight as to what the user is searching for. If the query is positively answered, then method 500 proceeds to step 550. If the query is negatively answered, then method 500 proceeds to step 540.

In step 530, method 500 queries whether K is a generic phrase. For example, the term "Apple" is both a brand and a generic phrase. If the query is positively answered, then method 500 proceeds to step 552. If the query is negatively answered, then method 500 proceeds to step 560.

In step 560, method 500 marks all K's related search terms as K's product. For example, if the search term is "Apple" and it has been identified as a brand, then method 500 will mark all related search terms, e.g., "Apple ipod", "Apple G3 computer" as Apple's product. This association will greatly enhance the ability to assist the user in narrowing the search as illustrated below.

In step 552, method 500 queries whether all related searches have been processed. If the query is positively answered, then method 500 returns to step 510. If the query is negatively answered, then method 500 proceeds to step 554.

In step 554, method 500 selects a related search term rk. For example, if K is "Apple", then a related search term can be "apple pie", "apple ipod", and so on.

In step 556, method 500 queries whether rk and K are in the same category. If the query is positively answered, then method 500 proceeds to step 558, where method 500 places rk into K's product list. If the query is negatively answered, then method 500 proceeds to step 557, where method 500 places rk into a related search list.

In step 540, method 500 queries whether all related searches have been processed. If the query is positively answered, then method 500 proceeds to step 545. If the query is negatively answered, then method 500 proceeds to step 541.

In step 541, method 500 selects a related search term rk. For example, if K is "digital camera", then rk can be "Sony digital camera".

In step 542, method 500 queries whether rk contains a brand B in the head or the tail of the search term in one embodiment. It should be noted that it is also possible to search in the middle of the search term if necessary. If the query is positively answered, then method 500 proceeds to step 543. If the query is negatively answered, then method 500 proceeds to step 544.

In step 543, method 500 places B as a brand of K. In step 544, method 500 places rk as a related search term. Both steps then return to step 540.

In step 545, method 500 queries whether only one element is in the brand list. If the query is positively answered, then method 500 proceeds to step 547. If the query is negatively answered, then method 500 returns to step 510.

In step 547, method 500 places the element into the related search. Method 500 then returns to step 510.

Figure 6:
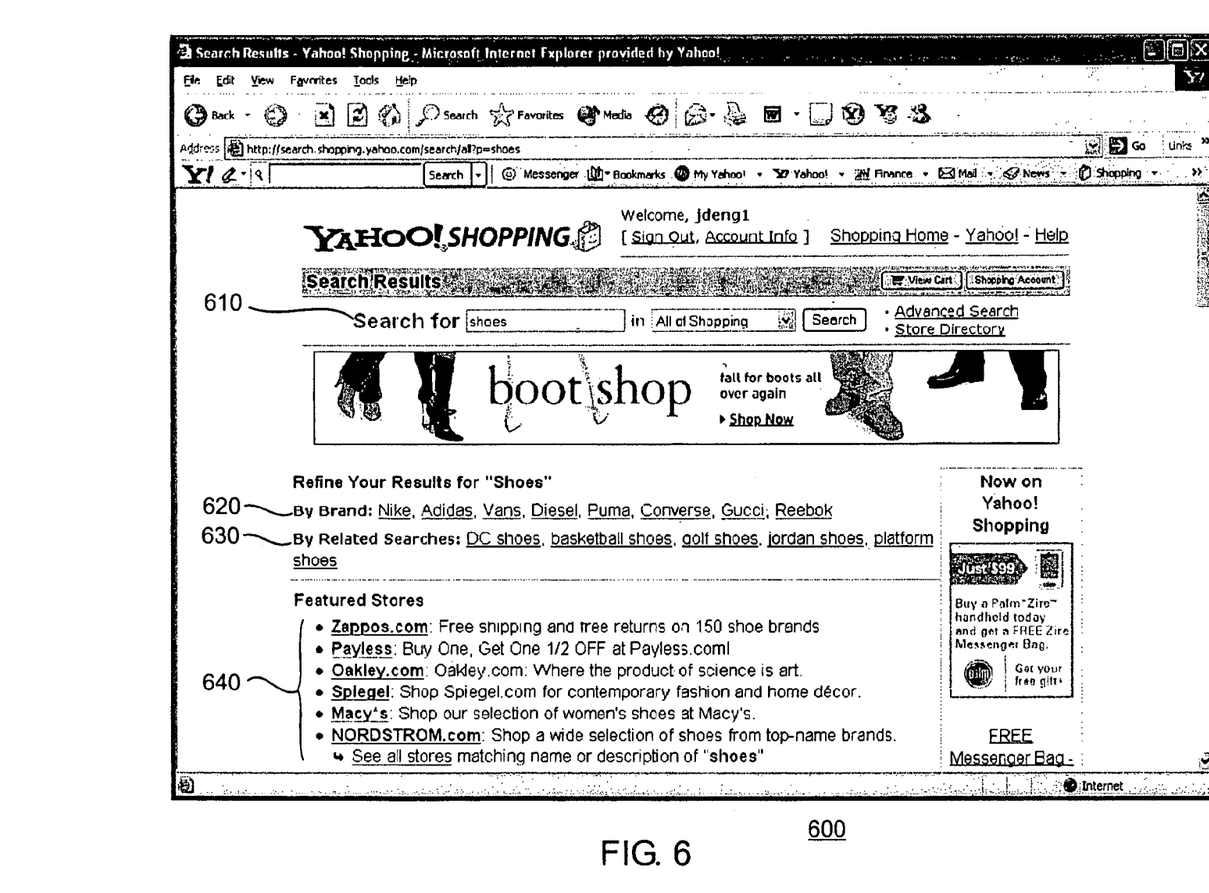
FIG. 6 illustrates a screenshot of the present invention.

FIG. 6 illustrates a screenshot 600 of the present invention. Specifically, a user entered the search term "shoes" 610. As a result of this search term, a plurality of candidate search terms 620 and 630 are also presented in addition to the search result 640. In this embodiment, the candidate search terms are presented and grouped into two categories: "By Brand" and "By Related Searches". Clearly, the category "By Brand" provides a plurality of brands of shoes, whereas the category "By Related Searches" presents a plurality of related search terms such as "DC shoes", "basketball shoes", "golf shoes" and so on.

Figure 7:
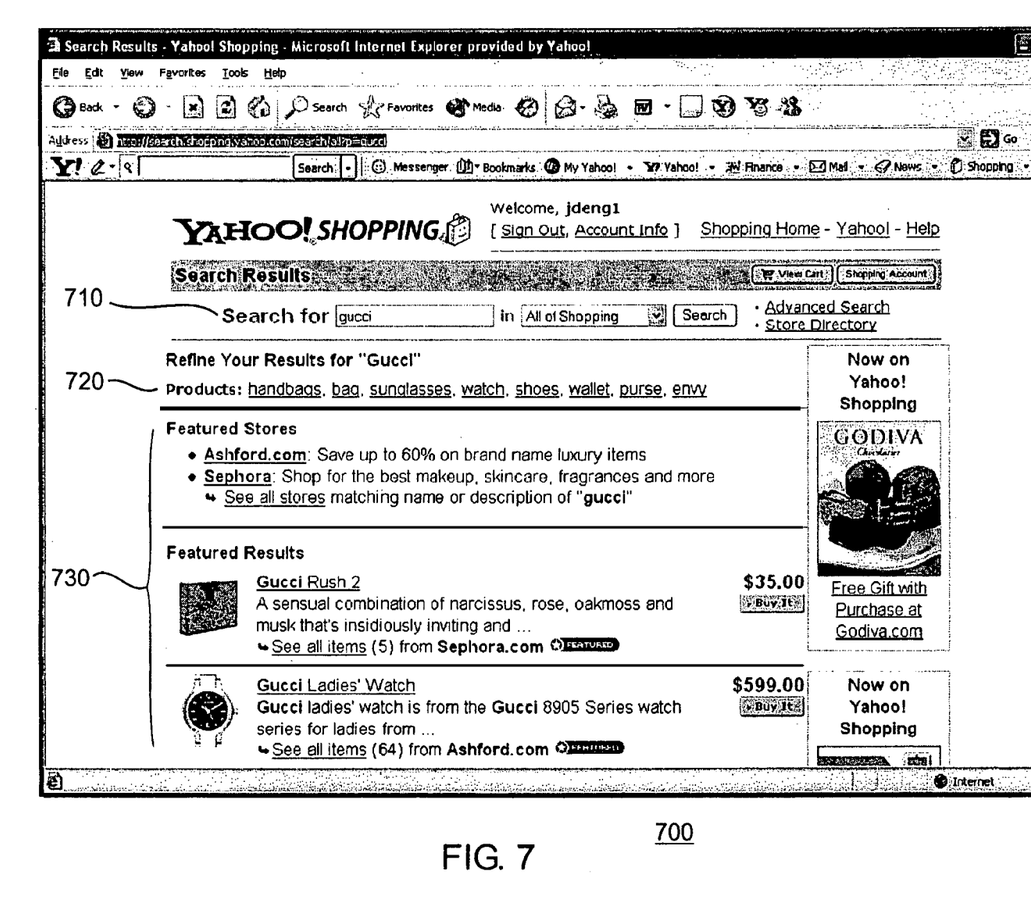
FIG. 7 illustrates a screenshot of the present invention.

FIG. 7 illustrates a screenshot 700 of the present invention. Specifically, a user entered the search term "Gucci" 710. As a result of this search term, a plurality of candidate search terms 720 are also presented in addition to the search result 730. In this embodiment, the candidate search terms are presented in a single category: "Products". Clearly, the category "Products" provides a plurality of products offered by Gucci such as "handbags", "bag", "sunglasses", "watch", "shoes" and so on. In this example, the search engine properly identified the search term as a brand and is able to quickly present a plurality of products instead of related searches as illustrated in FIG. 6.

Figure 8:
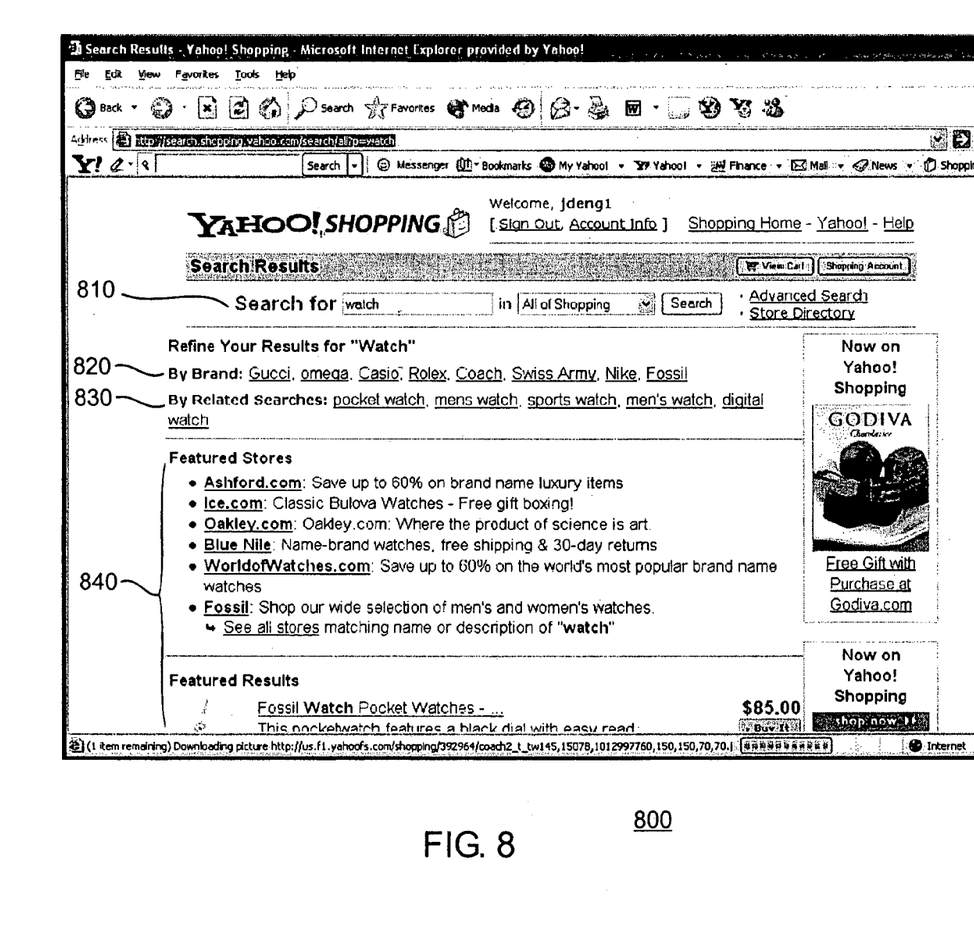
FIG. 8 illustrates a screenshot of the present invention.

FIG. 8 illustrates a screenshot 800 of the present invention. Specifically, a user entered the search term "watch" 810. As a result of this search term, a plurality of candidate search terms 820 and 830 are also presented in addition to the search result 840. In this embodiment, the candidate search terms are presented and grouped into two categories: "By Brand" and "By Related Searches". Clearly, the category "By Brand" provides a plurality of brands of watches, whereas the category "By Related Searches" presents a plurality of related search terms such as "pocket watch", "mens watch", "sports watch" and so on.

It should be noted that the candidate search terms can be implemented as links to other destinations as shown in FIGS. 6-8. Thus, in this fashion, the user can quickly narrow his or her search while gaining the benefit that the narrowing search terms and/or links will produce highly relevant results.

It should be noted that the above disclosure describes the present invention within the context of shopping. However, those skilled in the art will realize that the present invention is not so limited. Namely, in one embodiment, the present invention can be implemented for searching in general, e.g., generating the relevancy scores and related search terms in accordance with the click information.

In one embodiment, the present invention may optionally account for time and/or position. For example, it has been observed that the "higher" position a product is in a search result set, the higher probability that it is clicked/purchased by users. More specifically, it is an observation that clicks are affected by position (e.g., higher positioned products are often "clicked") while purchase is also affected (e.g., a purchaser is influenced as to the position of a relevant product). However, a user may click on the higher positioned products but may end up purchasing a product listed in a much lower position due to relevancy.

To address this observation, the present invention can be adapted to normalize the data to account for time and/or position in generating the candidate search terms. For example, the first position in a related search term set can be deemed to be located at a highest position within the related search term set. To illustrate, the related search term "DC shoes" can be deemed to be at a higher position that the related search term "platform shoes" as shown in FIG. 6. In order to present more pertinent related search terms with a high degree of confidence, the search terms can be normalized based on the position(s) when the click/purchase occurs. For example, a purchase or a click at a very low position document (e.g., far to the right in one embodiment) within the related search term set will indicate a high relevancy of that document relating to the search term. If the data (e.g., purchase and/or click data) supports repositioning, then the list of related search terms would be repositioned so that the most relevant related search term would be presented at the highest position. For example, if users who use the search term "shoes" often actually purchase "platform shoes", then the related search term "platform shoes" may be repositioned to a higher display position relative to other types of shoes. It should be noted that the term "higher" display position is relative in view of how the search results are presented to the user. For example, a higher display position may indicate an upper part or a left side of the display screen.

Optionally, the data can be normalized to account for time ("happen time" or "occurrence time"). Namely, how recent was the sale and/or click on the related search term. Normalization based on time may reflect a new trend in the market. Catching this trend and always showing the most popular related search terms first is one of the goals of the present invention. In other words, relevant search terms can be listed in an order that accounts for popularity or "time relevance" of the underlying products or services.

Various kinds of normalization functions for position and time normalization can be deployed. For example, the normalization based on time and/or position can be implemented when the relevancy scores are generated. For example, relevancy scores such as hotscores can be generated that have already accounted for the normalization based on time and/or position. Alternatively, if the relevancy scores do not account for the normalization based on time and/or position, then the normalization processes can be implemented as an optional step when relevancy scores are generated for the search terms.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for searching, said method comprising:
    storing, by at least one server computer, sales information related to a plurality of search terms, wherein the sales information includes an accumulation of a plurality of purchase transactions of a plurality of users;
    receiving, by the at least one server computer, a first search term from a user;
    generating, by the at least one server computer using the first search term, a first set of search results in response to receiving the first search term from the user; and
    dynamically generating, by the at least one server computer, a user interface page for the user, the user interface page comprising the first set of search results and a plurality of candidate search terms related to said first search term in accordance with relevancy scores calculated based in part on the sales information and click information related to the first search term, wherein said plurality of candidate search terms comprise a plurality of potential alternative search terms, and at least some or the plurality of candidate search terms being organized in accordance with brands, wherein the brands related to the first search term are determined based upon the sales information, wherein each of said plurality of potential alternative search terms is selectable by the user to request a second set of search results, and in response to a selection, by the user, of one of said plurality of potential alternative search terms, a second set of search results is generated for the user using the selected potential alternative search term, and wherein at least one user of said plurality of users does not have a user profile.

2. The method of claim 1, wherein said plurality of candidate search terms are organized in accordance with products.

3. The method of claim 1, wherein said plurality of candidate search terms are organized in accordance with related searches.

4. The method of claim 1, wherein said plurality of candidate search terms are presented as links to other destinations.

5. The method of claim 1, wherein said candidate search terms are generated off-line.

6. The method of claim 1, wherein said candidate search terms are organized in a look-up table.

7. The method claim 6, wherein said look-up table is a hash table.

8. The method of claim 1, wherein said candidate search terms are generated in accordance with a span that defines a number of word units.

9. The method of claim 8, wherein said span is greater than one word unit.

10. The method of claim 1, wherein said candidate search terms are refined in accordance with an inflection distance.

11. The method of claim 10, wherein said inflection distance is a measure of closeness between two search terms.

12. The method of claim 1, further comprising:
    comparing said first search term with a dictionary prior to providing said plurality of candidate search terms.

13. The method of claim 12, wherein said dictionary comprises a brand dictionary that comprises a plurality of brands.

14. The method of claim 13, wherein if said first search term is deemed to be a brand, then at least one of said plurality of candidate search terms is presented as a product of said brand.

15. The method of claim 12, wherein said dictionary comprises an artist dictionary that comprises at least one of singers, performers, bands, and actors.

16. The method of claim 1, further comprising:
normalizing said plurality of candidate search terms in accordance with occurrence time of said plurality of candidate search terms.

17. The method of claim 1, further comprising:
normalizing said plurality of candidate search terms in accordance with display position of said plurality of candidate search terms.

18. An apparatus for computer-implemented searching, comprising:
a memory for storing sales information related to a plurality of search terms, wherein the sales information includes an accumulation of a plurality of purchase transactions of a plurality of users;
means for receiving a first search term from a user; and
a processor for:
generating a first set of search results using the first search term in response to receiving the first search term from the user, and
dynamically generating a user interface page for the user, the user interface page comprising the first set of search results and a plurality of candidate search terms related to said first search term in accordance with relevancy scores calculated based in part on the sales information and click information related to the first search term, wherein said plurality of candidate search terms comprise a plurality of potential alternative search terms, and at least some of the plurality of candidate search terms being organized in accordance with brands, wherein the brands related to the first search term are determined based upon the sales information, wherein each of said plurality of potential alternative search terms is selectable by the user to request a second set of search results, and in response to a selection, by the user, of one of said plurality of potential alternative search terms, a second set of search results is generated for the user using the selected potential alternative search term, and wherein at least one user of said plurality of users does not have a user profile.

19. The apparatus of claim 18, wherein said plurality of candidate search terms are organized in accordance with products.

20. The apparatus of claim 18, wherein said plurality of candidate search terms are organized in accordance with related searches.

21. The apparatus of claim 18, wherein said plurality of candidate search terms are presented as links to other destinations.

22. The apparatus of claim 18, wherein said candidate search terms are generated off-line.

23. The apparatus of claim 18, wherein said candidate search terms are organized in a look-up table.

24. The apparatus of claim 23, wherein said look-up table is a hash table.

25. A computer-readable medium encoded with computer instructions, the plurality of instructions including instructions which, when executed by a processor, cause the processor to perform a method, the method comprising:
storing sales information related to a plurality of search terms, wherein the sales information includes an accumulation of a plurality of purchase transactions of a plurality of users;
receiving a first search term from a user;
generating a first set of search results using the first search term in response to receiving the first search term from the user; and
dynamically generating, a user interface page for the user, the user interface page comprising the first set of search results and a plurality of candidate search terms related to said first search term in accordance with relevancy scores calculated based in part on the sales information and click information related to the first search term, wherein said plurality of candidate search terms comprise a plurality of potential alternative search terms, and at least some of the plurality of candidate search terms being organized in accordance with brands, wherein the brands related to the first search term are determined based upon the sales information, wherein each of said plurality of potential alternative search terms is selectable by the user to request a second set of search results, and in response to a selection, by the user, of one of said plurality of potential alternative search terms, a second set of search results is generated for the user using the selected potential alternative search term, and wherein at least one user of said plurality of users does not have a user profile.

26. The computer-readable medium of claim 25, wherein said plurality of candidate search terms are organized in accordance with products.

27. The computer-readable medium of claim 25, wherein said plurality of candidate search terms is organized in accordance with related searches.

28. The computer-readable medium of claim 25, wherein said plurality of candidate search terms are presented as links to other destinations.

29. The computer-readable medium of claim 25, wherein said candidate search terms are generated off-line.

30. The computer-readable medium of claim 25, wherein said candidate search terms are organized in a look-up table.

31. The computer-readable medium of claim 30, wherein said look-up table is a hash table.

32. The computer-readable medium of claim 25, wherein said candidate search terms are generated in accordance with a span that defines a number of word units.

33. The computer-readable medium of claim 32, wherein said span is greater than one word unit.

34. The computer-readable medium of claim 25, wherein said candidate search terms are refined in accordance with an inflection distance.

35. The computer-readable medium of claim 34, wherein said inflection distance is a measure of closeness between two search terms.

36. The computer-readable medium of claim 25, further comprising the step of:
comparing said first search term with a dictionary prior to providing said plurality of candidate search terms.

37. The computer-readable medium of claim 36, wherein said dictionary comprises a brand dictionary that comprises a plurality of brands.

38. The computer-readable medium of claim 37, wherein if said first search term is deemed to be a brand, then at least one of said plurality of candidate search terms is presented as a product of said brand.

39. The computer-readable medium of claim 36, wherein said dictionary comprises an artist dictionary that comprises at least one of singers, performers, bands, and actors.

40. The computer-readable medium of claim 25, the method further comprising:
normalizing said plurality of candidate search terms in accordance with occurrence time of said plurality of candidate search terms.

41. The computer-readable medium of claim 25, the method further comprising:

normalizing said plurality of candidate search terms in accordance with display position of said plurality of candidate search terms.

42. The method of claim 1, wherein click information includes purchase data.

43. The method of claim 42, wherein the purchase data is based upon purchase behavior of a plurality of users.

44. The method of claim 1, wherein click information includes purchase data and click data.

45. The apparatus of claim 18, wherein click information includes purchase data.

46. The apparatus of claim 43, wherein the purchase data is based upon purchase behavior of a plurality of users.

47. The apparatus of claim 18, wherein click information includes purchase data and click data.

48. The computer-readable medium of claim 25, wherein click information includes purchase data.

49. The computer-readable medium of claim 48, wherein the purchase data is based upon purchase behavior of a plurality of users.

50. The computer-readable medium of claim 25, wherein click information includes purchase data and click data.

* * * * *